(12) United States Patent  (10) Patent No.: US 8,666,216 B2
Takisaki et al.  (45) Date of Patent: Mar. 4, 2014

(54) ADJUSTABLE TROUGH-COUPLERS

(75) Inventors: Walter Dean Takisaki, Spokane Valley, WA (US); Paul A. Knight, Spokane, WA (US); Steven W. Ellison, Mead, WA (US)

(73) Assignee: Telect, Inc., Liberty Lake, WA (US)

( * ) Notice: Subject to any disclaimer, the term of this patent is extended or adjusted under 35 U.S.C. 154(b) by 221 days.

(21) Appl. No.: 13/110,679

(22) Filed: May 18, 2011

(65) Prior Publication Data

US 2012/0294581 A1  Nov. 22, 2012

(51) Int. Cl.
  *G02B 6/00* (2006.01)
  *G02B 6/04* (2006.01)
  *G02B 6/06* (2006.01)

(52) U.S. Cl.
  USPC ........... 385/135; 385/115; 385/134; 385/136; 385/137

(58) Field of Classification Search
  USPC .................................. 385/115, 116, 134–137
  See application file for complete search history.

(56) References Cited

U.S. PATENT DOCUMENTS

| | | | |
|---|---|---|---|
| 5,100,221 A | 3/1992 | Carney et al. | |
| 5,142,606 A * | 8/1992 | Carney et al. | ................. 385/134 |
| 5,316,243 A | 5/1994 | Henneberger | |
| 5,752,781 A | 5/1998 | Haataja et al. | |
| 5,937,131 A | 8/1999 | Haataja et al. | |
| 5,971,509 A | 10/1999 | Deimen et al. | |
| 6,282,360 B1 | 8/2001 | Milanowski et al. | |
| 2003/0194195 A1 | 10/2003 | Thom | |
| 2004/0124321 A1 | 7/2004 | Kampf et al. | |
| 2011/0074117 A1 | 3/2011 | Caveney et al. | |

FOREIGN PATENT DOCUMENTS

WO  WO0218991  3/2002

OTHER PUBLICATIONS

The PCT Search Report mailed Nov. 28, 2012 for PCT application No. PCT/US12/35994, 9 pages.
U.S. Appl. No. 11/483,783 "Fiber Transition Trough Coupling System" filed May 1, 2003; 33 pages.

* cited by examiner

*Primary Examiner* — K. Cyrus Kianni
*Assistant Examiner* — Hung Lam
(74) *Attorney, Agent, or Firm* — Lee & Hayes, PLLC

(57) ABSTRACT

A telecommunications infrastructure includes first and second trough members for routing signal-carrying fibers. Coupling members may be used to adjustably couple a first trough member arranged alongside a second trough member together. Coupling members may also be used to adjustably couple a first trough member together with a second trough member terminating at the first trough member.

21 Claims, 9 Drawing Sheets

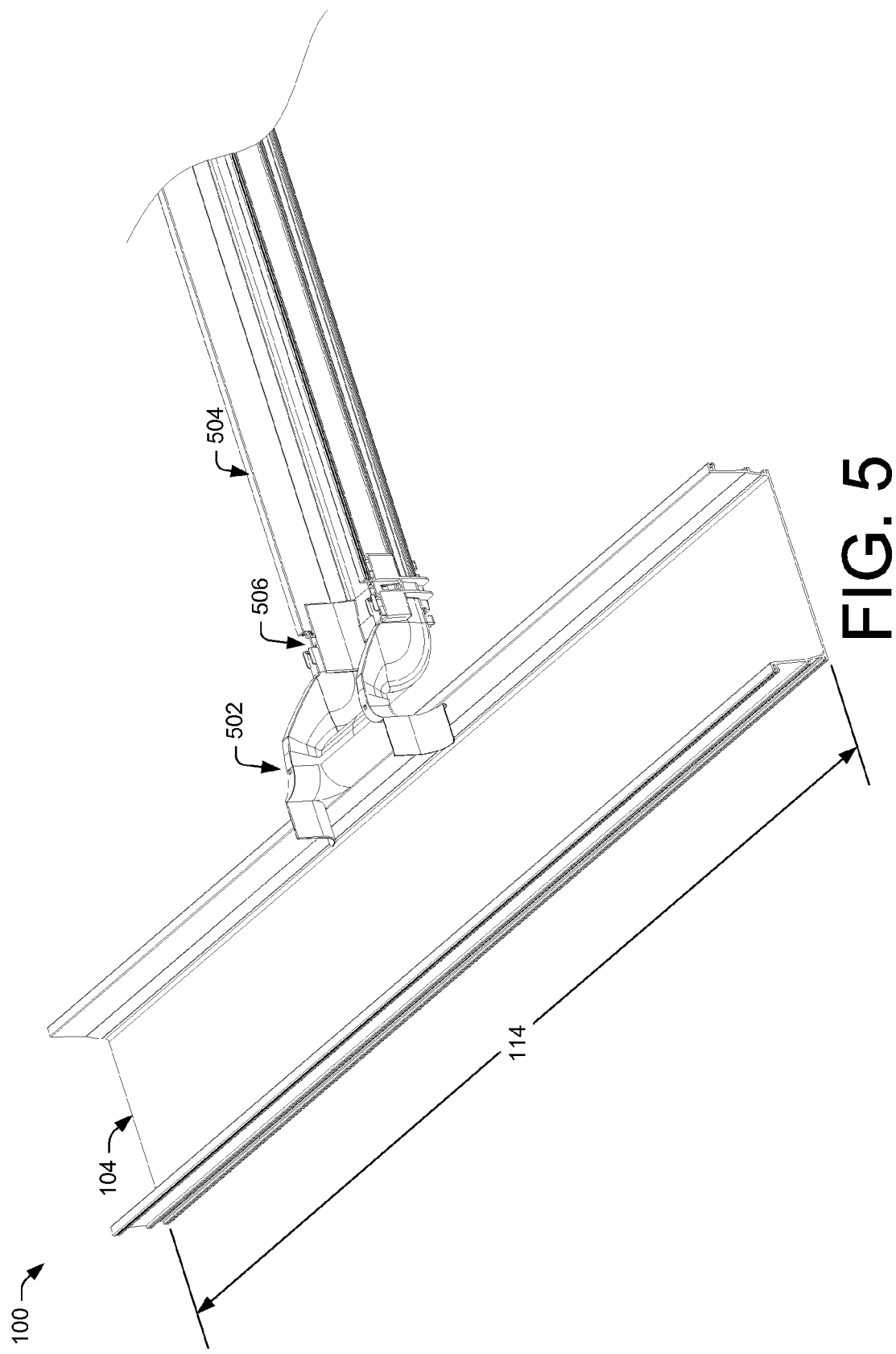

ADJUSTABLE TROUGH-COUPLERS

TECHNICAL FIELD

The disclosure relates generally to trough-coupling systems for managing and organizing fibers, such as optical fibers.

BACKGROUND

Optical fibers can be used to transmit large volumes of data and voice signals over relatively long distances, with little or no signal degradation. For this reason, optical fibers have become widely used in the telecommunication field. As the use of optical fibers has increased, new systems have been developed for managing and organizing larger numbers of optical fibers.

In a typical telecommunications facility, a trough system is used to route the fiber optic cables. Generally, the trough system is located overhead and over the location of the fiber optic racks, cabinets, and other equipment. The trough system in even a small telecommunications facility can be substantial, requiring significant time and expense to install. Some systems require tools for installation of the trough system, adding to the assembly time and expense. Even systems that do not require tools for installation of the system may require substantial planning to design the trough coupling system for a particular installation.

SUMMARY

Trough systems and components are disclosed, which can be assembled and disassembled quickly and easily, typically without any tools. In one aspect, a telecommunications infrastructure includes a first trough member arranged alongside a second trough member for routing signal-carrying fibers. A coupling member may be used to adjustably couple to the first and second trough members, bridging a gap disposed between the first and second trough members, for routing signal-carrying fibers across the gap and to and/or from the first and second trough members. The coupling member includes a convex passageway side to adjustably couple with the first trough member and a planar passageway side extending distal to the convex passageway side and bridging a portion of the gap separating the first trough member from the second trough member. Another coupling member and an extension member may be used to bridge the gap disposed between the first and second trough members.

In another aspect, a telecommunications infrastructure includes a first trough member and a second trough member terminating at the first trough member for routing signal-carrying fibers. A coupling member may be used to adjustably couple to the first trough member and to couple with the second trough member for routing signal-carrying fibers to and/or from the first and second trough members. The coupling member includes a convex passageway side to adjustably couple with the first trough member and a concave passageway side extending away from to the convex passageway side to couple with the second trough.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

FIG. 5 is a perspective view showing a coupling member adjustably coupled with a first trough and coupled with a second trough terminating at the first trough in an exemplary trough-coupling system.

DETAILED DESCRIPTION

This application describes implementations including adjustable trough-coupling systems and components thereof, such as adjustable bridge couplers and adjustable T-couplers for adjustably coupling multiple trough members together. The adjustable trough-coupling systems can be assembled and disassembled without impacting existing trough systems. This helps to minimize the time and expense of installing trough systems and/or reconfiguring or disassembling the trough systems after installation.

The implementations are described in the context of an overhead trough system for managing optical fibers in a telecommunications facility. However, the implementations described herein may be used in other environments and are applicable to other contexts. For example, the trough systems may be located at any desired location, including overhead, below the floor, or at any location in between. In addition, the apparatuses may be used to manage fibers other than optical fibers, such as wires, Ethernet cables, coaxial cables, and/or other signal carrying fibers, and may be used in any environment in which such fibers are used.

Exemplary Adjustable Trough-Coupling System(s)

Figure 1:
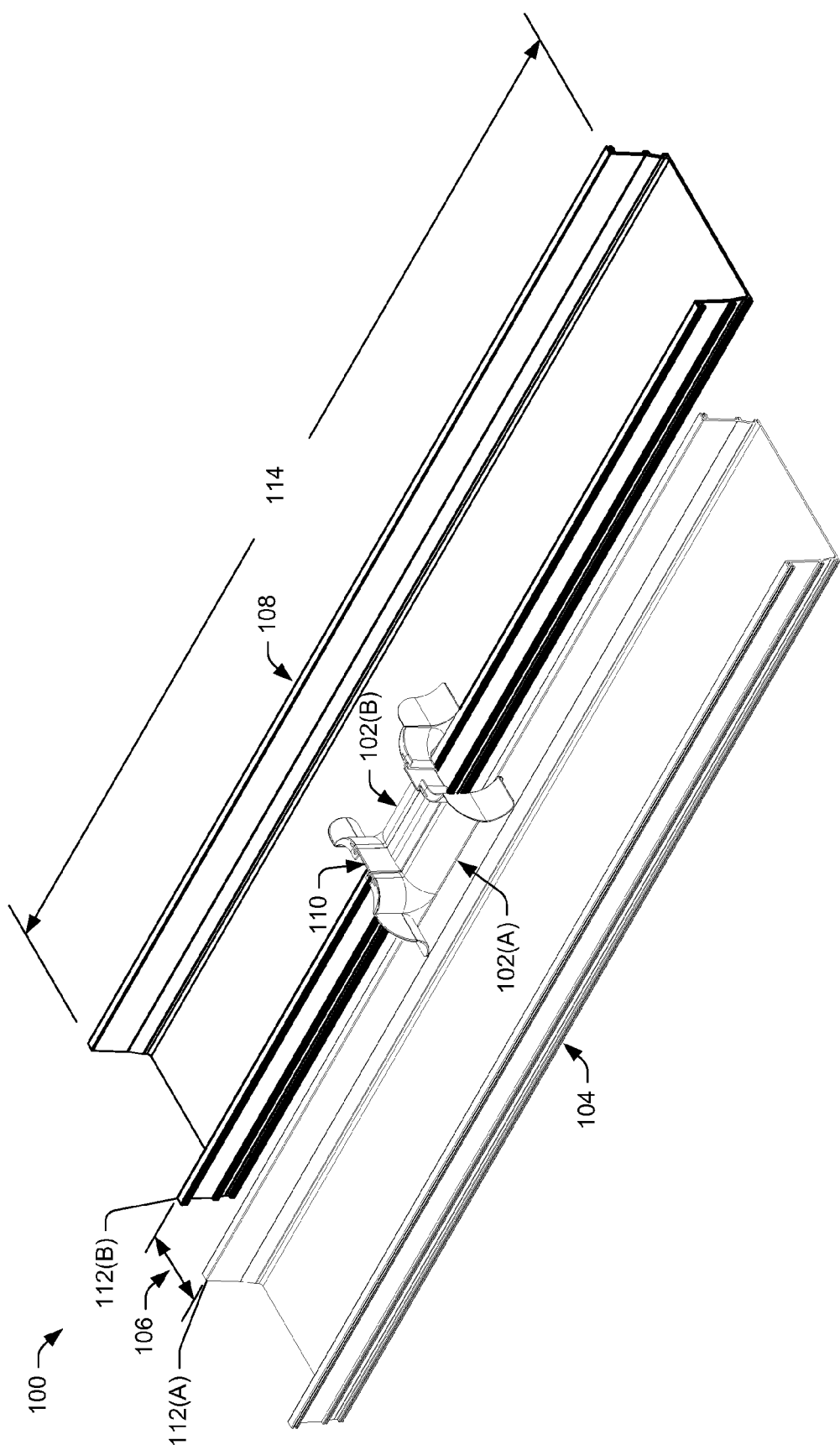
FIG. 1 is a perspective view showing a coupling member adjustably coupled with a first trough and bridging a portion of a gap separating the first trough from a second trough arranged alongside the first trough in an exemplary trough-coupling system.

FIG. 1 illustrates a portion of an exemplary trough system 100 comprising a coupling member 102(A) adjustably coupled with a first trough member 104 and bridging a portion of a gap 106 separating the first trough member 104 from a second trough member 108 arranged alongside the first trough member 104. Another coupling member 102(B) is shown adjustably coupled with the second trough member 108 and bridging another portion of the gap 106. An extension member 110 may adjustably couple the coupling member 102(A) adjustably coupled with the first trough member 104 with the other coupling member 102(B) adjustably coupled with the second trough member 108. The extension member 110 is shown bridging a remaining portion of the gap 106 separating the first trough member 104 from the second trough member 108. FIG. 1 shows that when the extension member 110, the coupling member 102(A), and the other coupling member 102(B) are substantially perpendicular to the first and second trough members 104 and 108. The trough system 100 may form a part of a telecommunications infrastructure for managing and routing optical fibers. While the coupling members 102(A) and 102(B) are shown to adjustably couple two trough members, it should be understood that any number coupling members may be used and configured to adjustably join any number of two or more trough members together and/or to join the trough members at different orientations relative to one another. A typical trough system might include a plurality of trough members of the same or different shapes, coupled together by a plurality of couplers of the same or different shapes and configurations. Trough systems may also include components for connecting the trough system to one or more other fiber management structures, such as racks, cabinets, chassis, and the like.

Generally, each of the coupling members 102(A) and 102(B) rest on a top of a ridge 112(A) and 112(B) (ridges 112 collectively) of the first and second trough members 104 and 108 for adjusting along a length 114 of the first and second trough members 104 and 108. While the coupling members may be illustrated as resting on top ridges of the trough members, the coupling members may be self supporting and arranged just above the trough systems. For example, the coupling members may be adjustably coupled with the trough members via a support member. The ridges 112 of the first and second trough members 104 and 108 may be substantially in the same plane. While the ridges 112 of the first and second trough members 104 and 108 may be shown to be substantially in the same plane, the ridges 112 of the first and second trough members 104 and 108 may be in different planes. For example, the ridges of the first trough member may be above or below the ridges of the second trough member. While the first trough member 104 and the second trough member 108 are shown to be separated by the gap 106, it should be understood that the first and second trough members 104 and 108 may be separated by any sized gap that the extension member 110 may be used and configured to bridge. For example, a typical trough system might include a plurality of trough members of the same or different shapes, separated by a plurality of different sized gaps. As such, there may be a plurality of different sized extension members 110 configured to span respective sized gaps. For example, an installer may need to span any sized gap (e.g., 3 inch (7.62 centimeters), 4 inch (10.16 centimeters), 6 inch (15.24 centimeters), 8 inch (20.32 centimeters), 12 inch (30.48 centimeters), or 24 inch (60.96 centimeters) gap) between first and second trough members 104 and 108. For example, the extension member 110 bridging the remaining portion of the gap 106 separating the first trough 104 from the second trough member 108 may comprises a length of up to about 24 inches (60.96 centimeters).

In some installations, trough systems may comprise multiple trough members that are all disposed within the same level plane. For example the first trough member 104 may be in the same plane as the second trough member 108. Further, an installer may install multiple coupling members 102(A) and 102(B), along with respective extension members 110, to bridge any number of gaps between multiple trough members. For example, an installer may bridge a first gap (e.g., a 4 inch (10.16 centimeters) gap) by installing the coupling members 102(A) and 102(B) on each trough member (e.g., first trough member 104 and second trough member 108) separated by the first gap (i.e., the 4 inch (10.16 centimeters) gap) and installing the extension member 110 to bridge the remaining portion of the first gap (i.e., the 4 inch (10.16 centimeters) gap). The installer may also bridge a second gap (e.g., a 24 inch (60.96 centimeters) gap) by installing the coupling members 102(A) and 102(B) on each trough member (e.g., first trough member 104 and second trough member 108) separated by the second gap (i.e., the 24 inch (60.96 centimeters) gap) and installing the extension member 110 to bridge the remaining portion of the second gap (i.e., the 24 inch (60.96 centimeters) gap). Further, the coupling members 102(A) and 102(B) may be selectively positioned at any location along the length 114 for managing and routing optical fibers at the selected position. For example, an installer may selectively position the coupling members 102(A) and 102(B) at a desired location to route optical fibers from the first trough member 104 to the second trough member 108 without compromising the first and second trough members. For example, an installer is able to route fiber cables from the first trough member 104 to the second trough member 108 without cutting into either the first or the second trough members 104 or 108.

Figure 2:
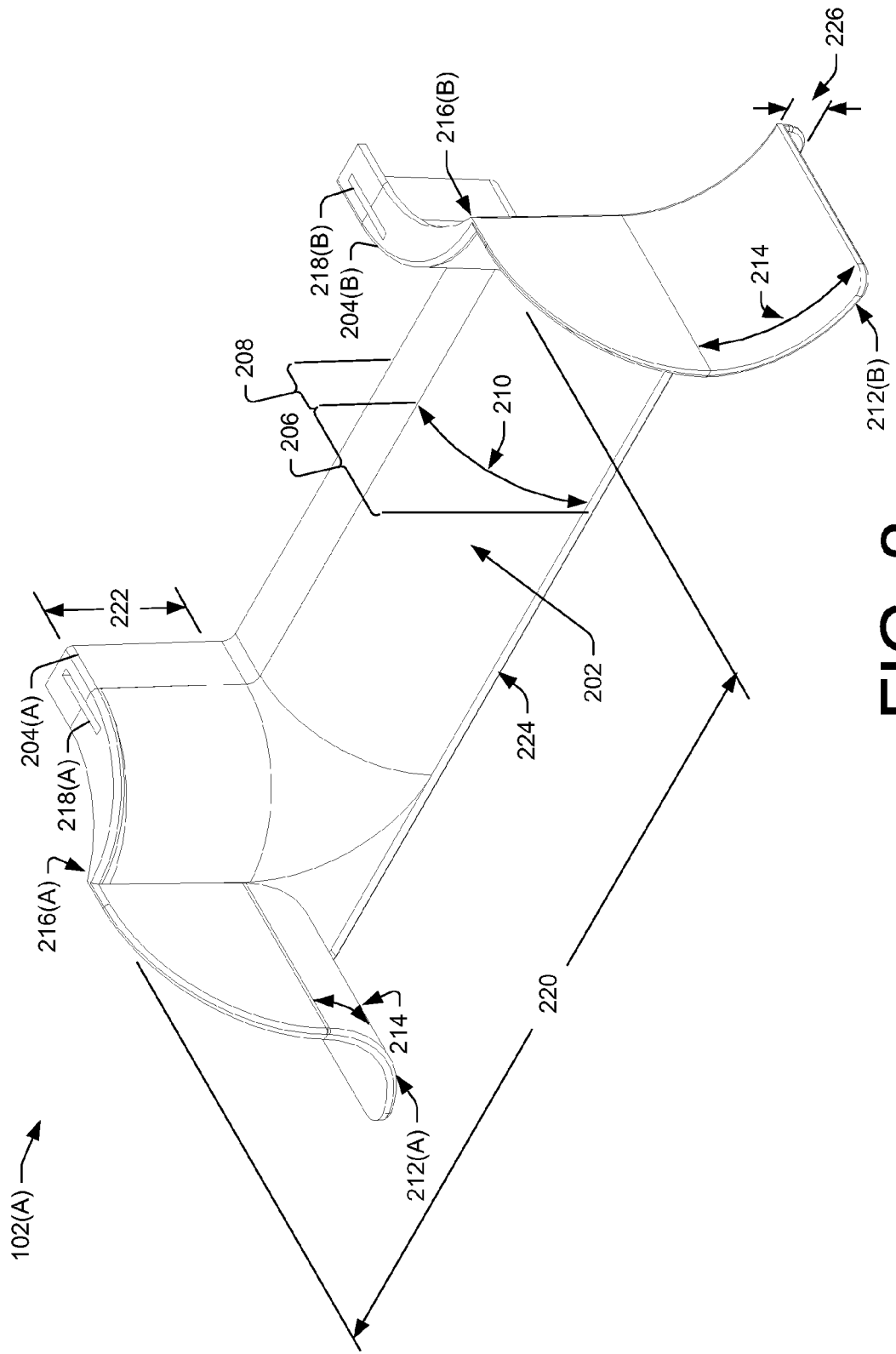
FIG. 2 is an isometric view showing the coupling member 102(A) of FIG. 1 in more detail.

FIG. 2 is an isometric view showing the coupling member 102(A) of FIG. 1 in more detail. The coupling member 102(A) includes a passageway base 202 disposed between first and second passageway walls 204(A) and 204(B) defining a fiber passageway. The passageway base 202 having a convex passageway side 206 and a planar passageway side 208 extending distal to the convex passageway side 206. FIG. 2 shows the convex passageway side 206 comprises a convex surface profile 210 having a bend radius of at least about 1 inch (2.54 centimeters). The convex surface profile 210 provides for a minimum bend radius to protect the fiber optic cables. While FIG. 2 illustrates a convex surface profile 210 having a bend radius of at least about 1 inch (2.54 centimeters), any convex surface profile suitable for managing a minimum bend radius to protect the fiber optic cables that may be placed and/or routed in a trough system 100 may be utilized. One example minimum bend radius is 1.5 inches (3.81 centimeters), while another example minimum bend radius is 1.18 inches (3 centimeters).

FIG. 2 further illustrates a first transition tab 212(A) having a convex surface 214 protruding distal from a first end 216(A) of the convex passageway side 206 and a second transition tab 212(B) having a convex surface 214 protruding distal from a second end 216(B) of the convex passageway side 206 opposite the first end 216(A). The convex surface 214 of the first and second transition tabs 212(A) and 212(B) may be arranged to face in towards the convex passage way side 206 and comprise a convex surface profile having a bend radius of at least about 1 inch (2.54 centimeters). The first and second transition tabs 212(A) and 212(B) may provide for managing fiber optic cables that may be routed to and/or from the first and second trough members 104 and 108. For example, an installer may route fiber optic cables from the first trough member 104 to the second trough member 108. As such, the installer may route fiber optic cables along the second transition tab 212(B), up and along the convex passageway side 206 of the first coupling member 102(A), across the extension member 110, down and along the convex passageway side 206 and a transition tab of the second coupling member 102(B). Further, the first and second passageway walls 204(A) and 204(B) may each have a convex surface profile. For example, the first and second passageway walls 204(A) and 204(B) may comprise a convex surface profile of at least about 1 inch (2.54 centimeters, or any other convex surface profile suitable for managing a minimum bend radius to protect the fiber optic cables that may be placed and/or routed in a trough system 100. Because the convex surfaces provide for a minimum bend radius to protect the fiber optic cables, installers may easily manage fiber optic cables in a trough system. As discussed above, any convex surface profile suitable for managing a minimum bend radius to protect the fiber optic cables that may be placed and/or routed in a trough system 100 may be utilized. One example minimum bend radius is 1.5 inches (3.81 centimeters), while another example minimum bend radius is 1.18 inches (3 centimeters).

As shown in this figure, the first and second passageway walls 204(A) and 204(B) may comprise a latch mechanism 218(A) and 218(B) (collectively latch mechanism 218) arranged in a top portion of each of the first and second passageway walls 204(A) and 204(B). FIG. 2 illustrates the latch mechanism 218 may comprise respective slender gaps 218(A) and 218(B) arranged along the top portion of each of the first and second passageway walls 204(A) and 204(B). The latch mechanism 218 may provide for adjustably coupling the adjustable coupling member 102(A) together with an extension member 110 (discussed in detail below with respect to FIG. 3).

As FIG. 2 illustrates, the coupling member 102(A) is shown having a width 220. Width 220 may comprise any distance suitable for placing and/or routing fiber optic cables. For example, width 220 may be approximately 4 inches (10.16 centimeters), 6 inches (15.24 centimeters), 12 inches (30.48 centimeters), 24 inches (60.96 centimeters) in width. In other examples smaller or larger widths could be used. Further, a width 220 may be specific to a width of a trough (e.g., first trough member 104 or second trough member 108). For example, a width of the coupling members 102(A) and 102(B) may be chosen based on a size of at least one of the trough members (e.g., first trough member 104 or second trough member 108) the coupling members 102(A) and 102(B) will couple together. For example, an installer may choose coupling members 102(A) and 102(B) having a width 220 greater than about 24 inches (60.96 centimeters) to adjustably couple a first trough having a width of 24 inches (60.96 centimeters) to a second trough having a width of 24 inches (60.96 centimeters). As another alternative, a width 220 may be specific to an amount of fiber optic cables that may be placed and/or routed in the trough system 100. For example, an installer may only need to place and/or route a single fiber optic cable to or from trough members (e.g., first trough member 104 and second trough member 108). In this example, an installer may choose coupling members 102(A) and 102(B) having a width 220 of about 4 inches (10.16 centimeters) to adjustably couple a first trough having a width of 12 inches (30.48 centimeters) to a second trough having a width of 4 inches (10.16 centimeters). Generally, the width 220 should be sufficient in size for managing a determined quantity of fiber optic cables to be placed and/or routed in a trough system 100 while minimizing a height 222 of the coupling members 102(A) and 102(B).

The coupling members 102(A) and 102(B) is shown having a lip 224 formed along an end of the convex passageway side 206. The lip 224 is shown having a length 226 for extending into a trough (e.g., first or second trough members 104 or 108) and along an inner wall of a trough. The lip 224 provides for an adjustable contact surface between a coupling member (e.g., coupling members 102(A) and 102(B)) and a trough. The length 226 may be any distance suitable for extending into a trough and providing an adjustable contact surface.

Figure 3:
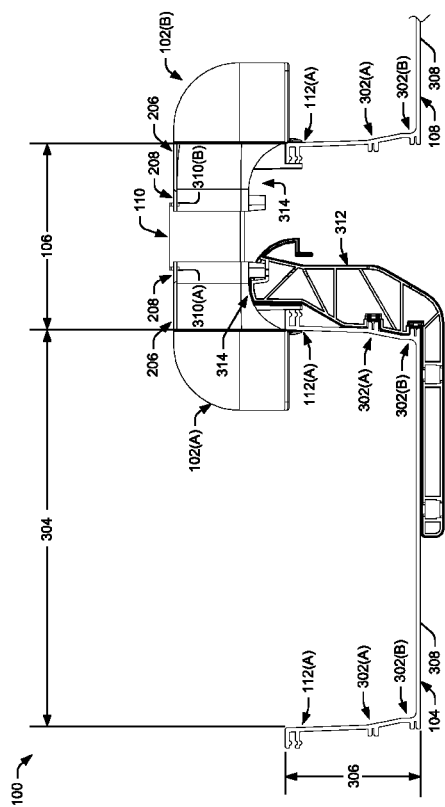
FIG. 3 is a side view showing the coupling members adjustably coupled with the first and second troughs in an exemplary trough-coupling system.

FIG. 3 is a side view of the trough system 100 showing the coupling members 102(A) and 102(B) adjustably coupled to the first and second trough members 104 and 108. As shown in this figure, the coupling members 102(A) and 102(B) may rest on a top of a ridge 112(A) extending along all or part of the length of the first trough member 104. The first and second trough members 104 and 108 may have one or more ridges extending along all or part of the length of the first and second trough members 104 and 108 that lend strength and rigidity to the first and second trough members 104 and 108. The first and second trough members 104 and 108 shown in the figures have three pairs of ridges 112(A), 302(A) and 302(B), extending the entire length of the first and second trough members 104 and 108. Of course, first and second trough members 104 and 108 could have any number of ridges. In addition, the trough members can be formed in virtually any desired shape, size, and configuration. For example, first and second trough members 104 and 108 may be 4 inches (10.16 centimeters), 6 inches (15.24 centimeters), 12 inches (30.48 centimeters), 24 inches (60.96 centimeters), or any other dimension wide. While FIG. 3 illustrates the first trough member 104 having a width 304 of approximately 12 inches the width 304 may be any suitable width for managing fiber optic cables to be placed and/or routed in a trough system 100. Similarly, the trough member 108 may have any suitable width 304 for managing fiber optic cables to be placed and/or routed in a trough system 100. The width 304 should be sufficient in size for managing a determined quantity of fiber optic cables to be placed and/or routed in a trough system 100 while minimizing a height 306 of the first and second trough members 104 and 108. As discussed above, the coupling members 102(A) and 102(B) have about the similar height 222. Further, the first and second trough members 104 and 108 are shown in FIG. 3 having about the similar height 306. The height 222 of coupling members 102(A) and 102(B) being less than the height 306 of the first and second trough members 104 and 108.

The first and second trough members 104 and 108 are shown in this figure having a bottom surface 308. While FIG. 3 illustrates the first and second trough members 104 and 108 each having the bottom surfaces 308 that are substantially within a same plane, the first and second trough members 104 and 108 may be arranged to have bottom surfaces 308 that are in two different planes. Further, the first and second trough members 104 and 108 are shown in this figure as being separated by the gap 106. As discussed above, the first and second trough members 104 and 108 may be separated by any sized gap.

The first trough member 104 is shown bridging a portion of the gap 106 separating the first trough member 104 from the second trough member 108 arranged alongside the first trough member 104. The other coupling member 102(B) is shown adjustably coupled with the second trough member 108 and bridging another portion of the gap 106. An extension member 110 is shown adjustably coupling the coupling member 102(A) adjustably coupled with the first trough member 104 with the other coupling member 102(B) adjustably coupled with the second trough member 108. The extension member 110 is shown bridging the remaining portion of the gap 106 separating the first trough member 104 from the second trough member 108. Specifically, the convex passageway side 206 is shown adjustably coupled with the first trough member 104 and the planar passageway side 208 is shown extending distal to the convex passageway side 206 and bridging a portion of the gap 106 separating the first trough member 104 from the second trough member 108. Similarly, the other coupling member 102(B) is shown, adjustably coupled with the second trough member 108 and bridging another portion of the gap 106 separating the first trough member 104 from the second trough member 108, also having a planar passageway side 208 extending distal to the convex passageway side 206 and bridging a portion of the gap 106 separating the second trough member 108 from the first trough member 104.

The extension member 110 is shown adjustably coupling the coupling member 102(A) adjustably coupled with the first trough member 104 with the other coupling member 102(B) adjustably coupled with the second trough member 108. The extension member 110 is also shown bridging a remaining portion of the gap 106 separating the first trough member 104 from the second trough member 108. FIG. 3 shows the extension member 110 adjustably couples the coupling member 102(A) adjustably coupled with the first trough member 104 and the other coupling member 102(B) adjustably coupled with the second trough member 108 via the latch mechanism 218 arranged in the first and second passageway walls 204(A) and 204(B) of the coupling members 102(A) and 102(B). The latch mechanism 218 is shown in this figure as comprising respective tabs 310(A) and 310(B) extending distal from the extension member 110 and protruding through respective slender gaps 218(A) and 218(B) arranged along the top portion of each of the first and second passageway walls 204(A) and 204(B). Specifically, tabs 310(A) and 310(B) protruding through respective slender gaps 218(A) and 218(B) may be selectively positioned within the slender gaps 218(A) and 218(B). For example, an installer may adjust and/or selectively position the extension member 110 in-between the coupling members 102(A) and 102(B) by adjusting the tabs 310(A) and 310(B) extending distal from the extension member 110 in the respective slender gaps 218(A) and 218(B). Further, the latch mechanism 218 may provide for relieving a tolerance stack of the trough system 100. For example, the tolerance stack of the trough system may comprise the assembly comprising the coupling members 102(A) and 102(B) adjustably coupled to the first and second trough members 104 and 108, which may effect the size of the gap 106. As such, the latch mechanism 218 may provide for relieving the potential size differences in the trough system 100. The latch mechanism 218 may provide for enclosing the fiber passageway via a lid. For example a lid may removeably latch with the latch mechanism 218 and contain the fiber optic cables routed in the fiber passageway.

FIG. 3 illustrates a support member 312 adjustably coupled with the ridges 302(A) and 302(B) of the first trough member 104 and coupled to an underside 314 of the planar passageway side 208 of the passageway base 202 of the coupling member 102(A) adjustably coupled with the first trough member 104. The support member may be coupled with the ridges 302(A) and 302(B) and the bottom surface 308 via fasteners (e.g., pins, threaded fasteners, rivets, press-fit, interference-fit or the like). The support member 312 is also shown to be coupled with the bottom surface 308 of the first trough member 104. While not shown, another support member 312 may be adjustably coupled with the ridges 302(A) and 302(B) of the second trough member 108 and coupled to the underside 314 of the planar passageway side 208 of the passageway base 202 of the coupling member 102(B) adjustably coupled with the second trough member 108. FIG. 3 shows the first and second trough members 104 and 108 are substantially within a plane and the extension member 110, the coupling members 102(A) and 102(B are substantially within another plane parallel to the plane of first and second trough members 104 and 108.

Figure 4:
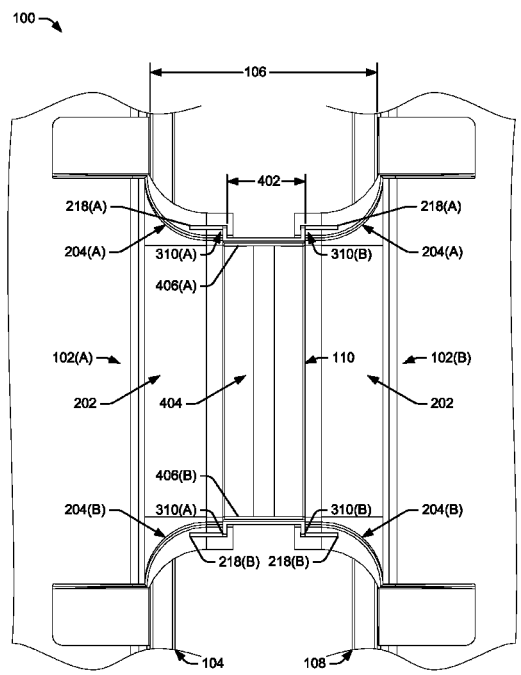
FIG. 4 is a top view showing the coupling members adjustably coupled with the first and second troughs in an exemplary trough-coupling system.

FIG. 4 is a top view of the of the trough system 100 showing the coupling members 102(A) and 102(B) adjustably coupled to the first and second trough members 104 and 108 shown in FIG. 3. FIG. 4 shows the extension member 110 adjustably couples the coupling member 102(A) adjustably coupled with the first trough member 104 and the other coupling member 102(B) adjustably coupled with the second trough member 108 via the latch mechanism 218 arranged in the first and second passageway walls 204(A) and 204(B) of the coupling members 102(A) and 102(B). The latch mechanism 218 is shown in this figure as comprising respective tabs 310(A) and 310(B) extending distal from the extension member 110 and protruding through respective slender gaps 218(A) and 218(B) arranged along the top portion of each of the first and second passageway walls 204(A) and 204(B).

The first and second trough members 104 and 108 are shown in this figure as being separated by the gap 106. The extension member 110 is shown having a length 402 suitable for bridging a remaining portion of the gap 106 separating the first trough member 104 from the second trough member 108. As discussed above, the first and second trough members 104 and 108 may be separated by any sized gap 106 that the extension member 110 may be used and configured to bridge. As such, the length 402 of the extension member 110 may be any suitable length. For example, the length 402 of the extension member 110 may be approximately 3 inches (7.62 centimeters), 4 inches (10.16 centimeters), 6 inches (15.24 centimeters), 12 inches (30.48 centimeters), 24 inches (60.96 centimeters) for bridging a remaining portion of the gap 106.

FIG. 4 illustrates the extension member 110 having a passageway base 404 disposed between first and second passageway walls 406(A) and 406(B) defining a fiber passageway. Further, the passageway base 404 of the extension member 110 provides for connecting with the passageway bases 202 of the coupling members 102(A) and 102(B).

FIG. 5 illustrates a portion of the exemplary trough system 100 comprising a coupling member 502 adjustably coupled with the first trough member 104 and coupled with a second trough member 504 terminating at the first trough member 104. A coupler 506 is shown to releasably couple the end of the second trough member 504 with the coupling member 502.

The coupling member 502 is shown adjustably coupled to the first trough member 104. While the second trough member 504 is shown terminating proximate to a middle portion of the first trough member 104, the second trough member 504 may terminate at any location along the length 114. Because the coupling member 502 is adjustably coupled with the first trough member 104, the coupling member 502 may be selectively positioned at any location along the length 114 and align with the second trough member 504 terminating at the first trough member 104. For example, an installer may selectively position the coupling member 102(A) at a location to align with the second trough member 504 terminating at the first trough member 104 without compromising the first trough member. For example, an installer is able to route fiber cables from the first trough member 104 to the second trough member 504 without cutting into either the first trough member 104. While FIG. 5 illustrates the second trough member 504 terminating at the first trough member 104 at a substantially perpendicular orientation, the second trough member 504 may terminate at the first trough member 104 at any number of orientations. For example, the second trough member 504 may terminate at the first trough member 104 at approximately 45 degrees. In configurations comprising the second trough member 504 terminating at the first trough member 104 at any orientation other than at the perpendicular orientation, the trough system 100 may utilize another coupling (e.g., an elbow coupling) to couple the second trough member 504 terminating at the first trough member 104.

Figure 6A:
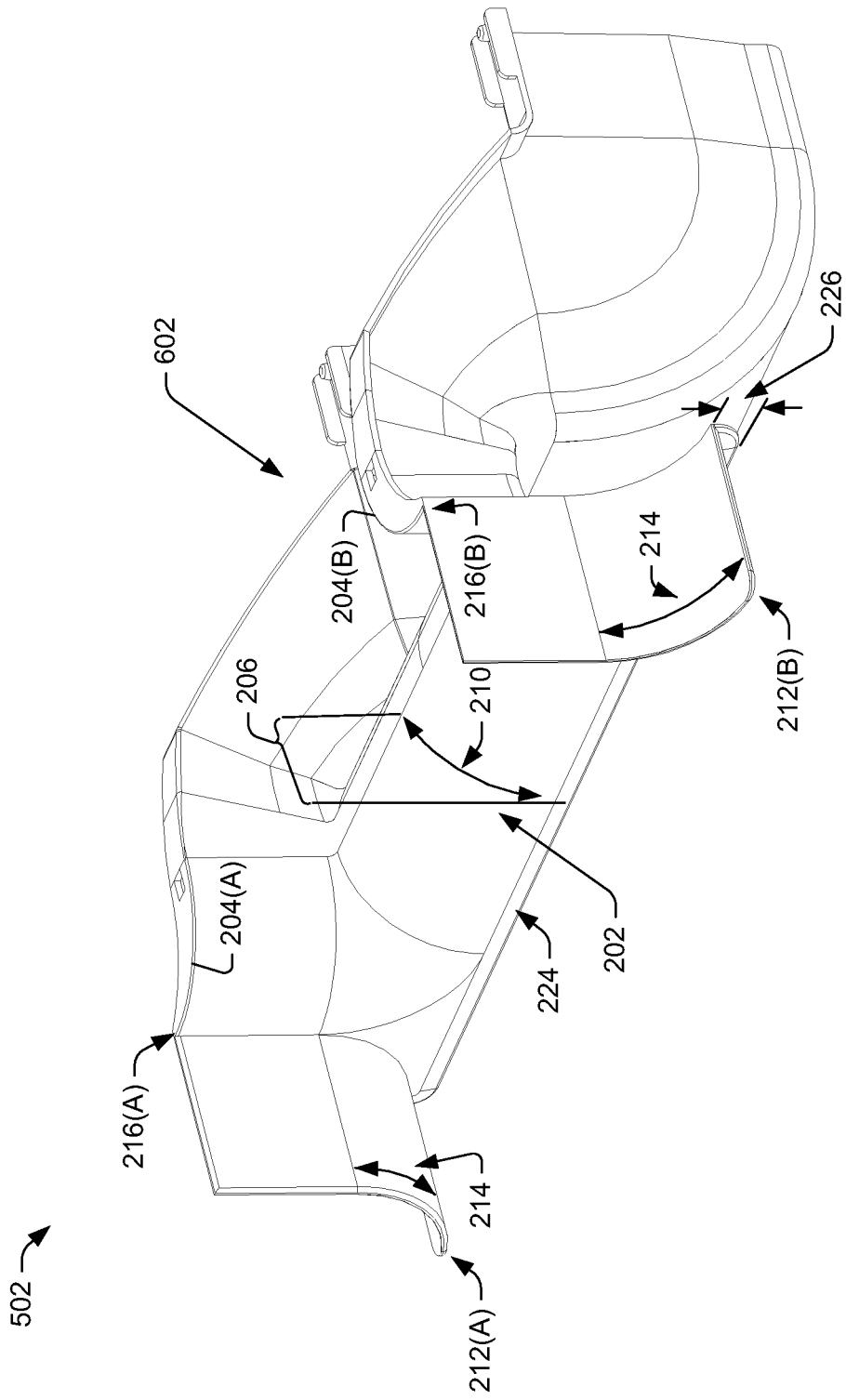
FIGS. 6(A) and 6(B) are perspective views that show the coupling member of FIG. 5 in more detail.
Figure 6B:
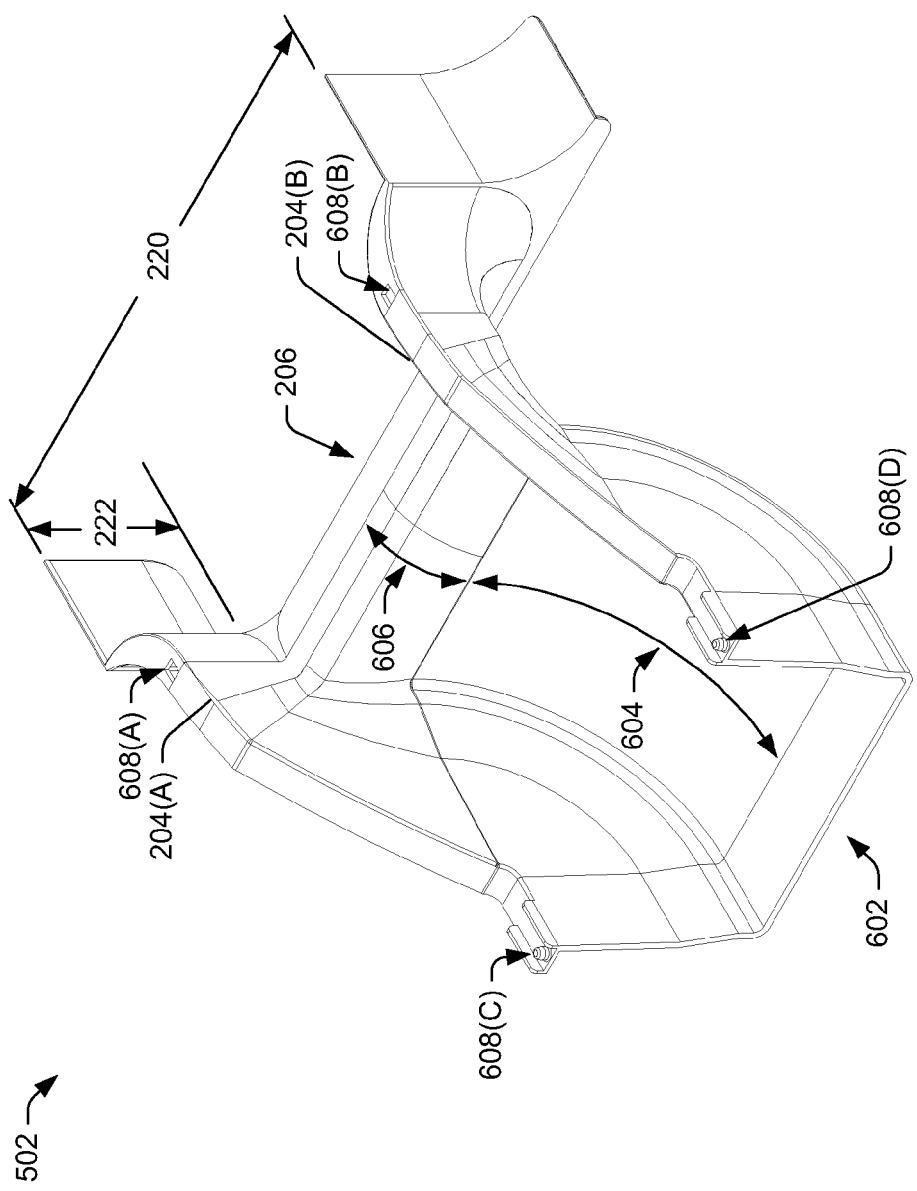

FIGS. 6(A) and 6(B) are perspective views that show the coupling member 502 of FIG. 5 in more detail. FIG. 6(A) shows the coupling member 502 includes similar features as the coupling members 102(A) and 102(B). For example, the coupling member 502 is shown having a passageway base 202 disposed between first and second passageway walls 204(A) and 204(B) defining a fiber passageway. The passageway base 202 having a convex passageway side 206 comprising a convex surface profile 210 having a bend radius of at least about 1 inch (2.54 centimeters). As discussed above, the convex surface profile 210 provides for a minimum bend radius to protect the fiber optic cables. In addition, the coupling member 502 is shown having the first transition tab 212(A) having the convex surface 214 protruding distal from the first end 216(A) of the convex passageway side 206 and the second transition tab 212(B) having the convex surface 214 protruding distal from the second end 216(B) of the convex passageway side 206 opposite the first end 216(A). The convex passageway side 206 is shown having the lip 224 for extending into a trough (e.g., the first trough members 104) and along an inner wall of a trough. The lip 224 provides for an adjustable contact surface between a coupling member (e.g., coupling members 502) and a trough. As discussed above, the length 226 may be any distance suitable for extending into a trough and providing an adjustable contact surface.

FIGS. 6(A) and 6(B) show the coupling member 502 includes a concave passageway side 602 extending away from to the convex passageway side 206. The concave passageway side 602 for releasably coupling with the second trough member 504. The concave passageway side 602 is shown having a concave surface profile 604 having at least about a 4 inch (10.16 centimeters) bend radius. The concave surface profile 604 provides for a minimum bend radius to protect the fiber optic cables. In addition, the concave passageway side 602 may comprise a convex surface profile 606 connecting the concave passageway side 602 with the convex passageway side 206. The convex surface profile 606 is shown having a bend radius of at least about 1 inch (2.54 centimeters).

The coupling member 502 is shown having the width 220 and the height 222. As discussed above, the width 220 should be sufficient in size for managing a determined quantity of fiber optic cables to be placed and/or routed in a trough system 100 while minimizing a height 222 of the coupling member 502. FIG. 6(B) shows a latch mechanism 608(A), 608(B), 608(C), and 608(D) (collectively latch mechanism 608) arranged in a top portion of each of the first and second passageway walls 204(A) and 204(B). The latch mechanism 608 may provide for enclosing the fiber passageway via a lid. For example a lid may removeably latch with the latch mechanism 608 and contain the fiber optic cables routed in the fiber passageway. FIG. 6 illustrates the latch mechanism 608 may comprise respective notches 608(A) and 608(B) and respective posts 608(C) and 608(D) disposed in the top portion of each of the first and second passageway walls 204(A) and 204(B).

Figure 7:
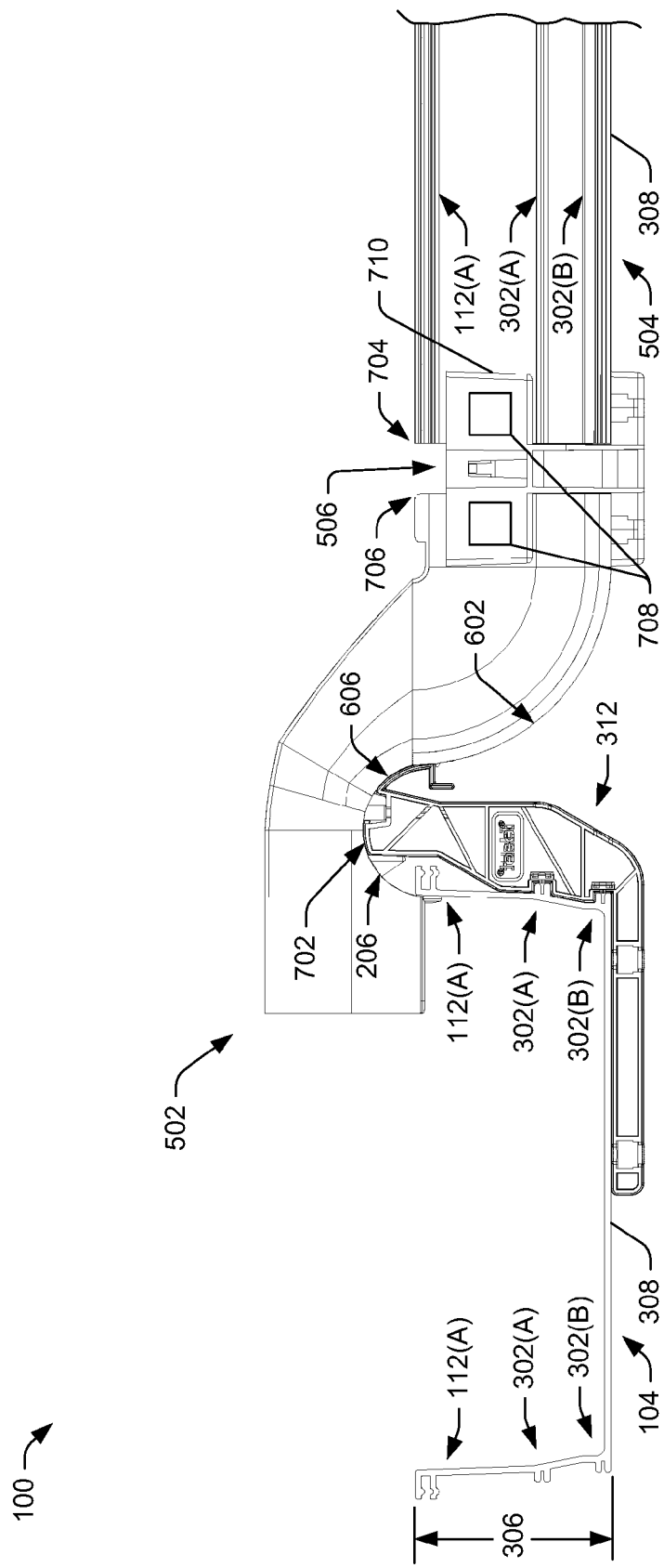
FIG. 7 is a side view showing a coupling member adjustably coupled with a first trough and coupled with a second trough terminating at the first trough in an exemplary trough-coupling system.

FIG. 7 is a side view of the trough system 100 showing the coupling member 502 adjustably coupled with the first trough member 104 and coupled with the second trough member 504 terminating at the first trough member 104. As shown in this figure, the coupling member 502 may be coupled to the support member 312. The support member 312 may be coupled to an underside 702 of the coupling member 502. For example, the support member 312 may couple to the underside 702 of the coupling member 502 proximate to the convex surface profile 606 connecting the concave passageway side 602 with the convex passageway side 206.

The first and second trough members 104 and 504 are shown in this figure having a bottom surface 308. For example, the bottom surfaces 308 of each of the first and second trough members may be planar bottom surfaces substantially within a same plane. While FIG. 3 illustrates the first and second trough members 104 and 504 each having the bottom surfaces 308 that are approximately within a same plane, the first and second trough members 104 and 504 may be arranged to have bottom surfaces 308 that are in two different planes. The first and second trough members 104 and 504 shown in the figures have three pairs of ridges 112 (A), 302(A) and 302(B), extending the entire length of the first and second trough members 104 and 504. The support member 312 is shown adjustably coupled with the ridges 302(A) and 302(B) of the first trough member 104. The support member 312 is also shown to be coupled with the bottom surface 308 of the first trough member 104. Because the coupling member 502 is coupled with the support member 312 adjustably coupled with the first trough member 104 via the ridges 302(A) and 302(B) extending the entire length of the first trough member 104, the coupling member 502 may be selectively positioned at any location along the length 114 of the first trough member 104 and align with the second trough member 504 terminating at the first trough member 104. The support member may be coupled with the ridges 302(A) and 302(B) and the bottom surface 308 via fasteners (e.g., pins, threaded fasteners, rivets, press-fit, interference-fit or the like).

FIG. 7 shows the coupler 506 releasably coupling a terminating end 704 of the second trough member 504 with an end 706 of the concave passageway side 602 of the coupling member 502. The coupler 506 may comprise a latch mechanism 708 disposed in a framework 710. The latch mechanism 708 may be a snap-fit, press-fit, interference-fit, fastener, quick-release mechanism, or the like, disposed in the framework 710 of the coupler 506.

Figure 8:
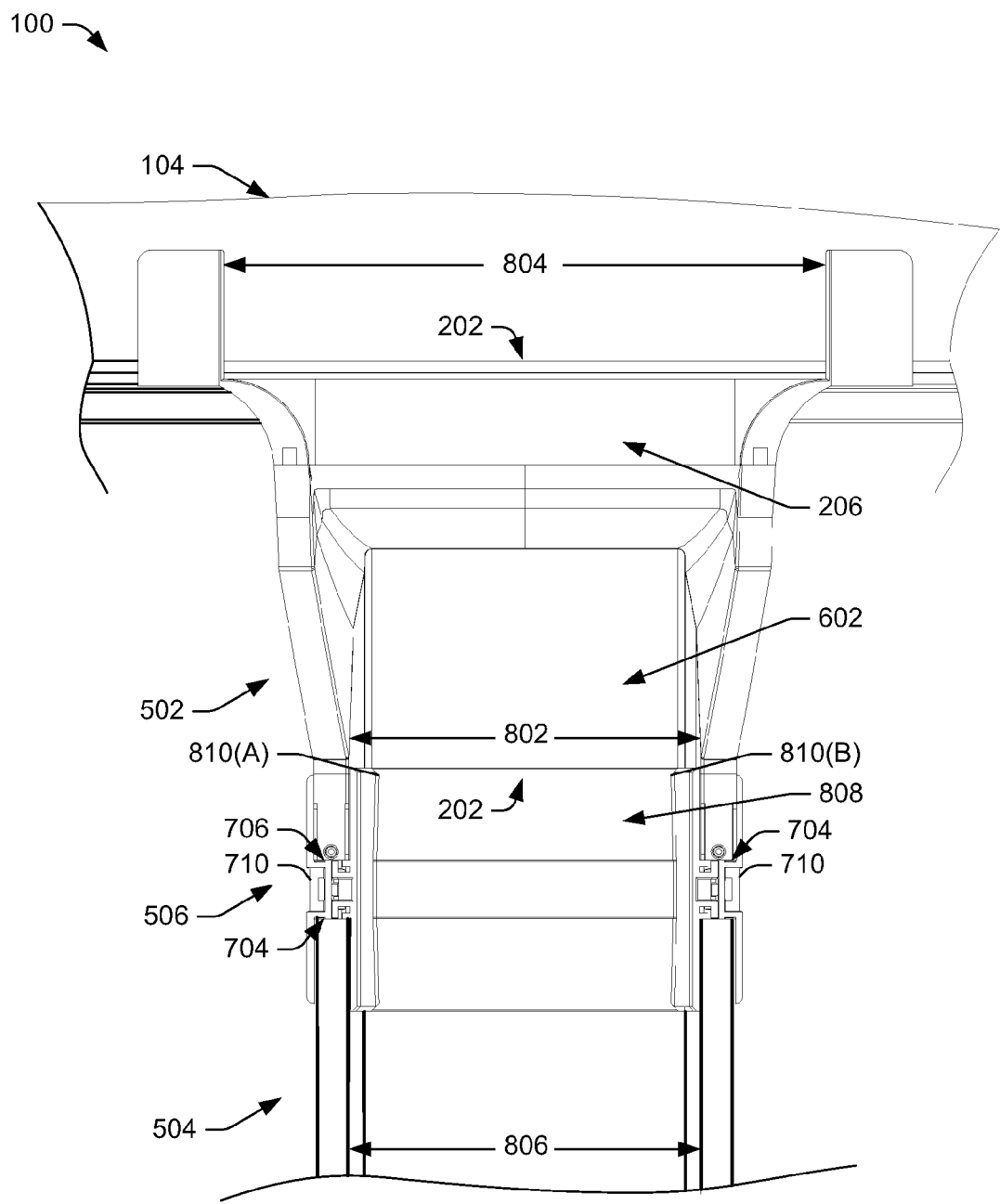
FIG. 8 is a top view showing a coupling member adjustably coupled with a first trough and coupled with a second trough terminating at the first trough in an exemplary trough-coupling system.

FIG. 8 is a top view of the exemplary trough system 100 comprising the coupling member 502 adjustably coupled with the first trough member 104 and coupled with the second trough member 504 terminating at the first trough member 104. The coupling member 502 is shown having a concave passageway base width 802 and a convex passageway base width 804. The concave passageway base width 802 is the width of the passageway base 202 of the concave passageway side 602. The convex passageway base width 804 is the width of the passageway base 202 of the convex passage way side 206. As FIG. 8 illustrates, the concave passageway base width 802 comprises a width less than a width of convex passageway base width 804. Further, the concave passageway base width 802 is shown to be approximately equal to a width 806 of the second trough member 504 terminating at the first trough member 104. Generally, the convex passageway base width 804 is greater than a trough width. By having a coupling width (e.g., the convex passageway base width 804) that is greater than a trough width (e.g., second trough member 504 width 806) the height (e.g., height 222) of the coupling members (e.g., coupling members 102(A), 102(B), and/or 502) may be minimized. For example, the second trough member 504 may have a width 804 sufficient in size for managing a determined quantity of fiber optic cables to be placed and/or routed in the second trough member 504. For example, the second trough member 504 may have a width 804 of approximately about 6 inches (15.24 centimeters) and capable of managing a determined quantity of fiber optic cables to be placed and/or routed in the second trough member 504 having a width 804 of approximately about 6 inches (15.24 centimeters). Further, the coupling member 502 may comprise a convex passageway base width 804 greater than approximately about 6 inches (15.24 centimeters). By having a convex passageway base width 804 greater than approximately about 6 inches (15.24 centimeters), this provides for the height 222 of the second trough member 504 to be minimized.

This provides for minimizing a trough systems 100 overall height. For example, the overall height may comprise height 306 plus height 222 and because the height 222 is minimized, by having a coupling width (e.g., the convex passageway base width 804) that is greater than a trough width (e.g., second trough member 504 width 806), the overall height is also minimized.

FIG. 8 shows the coupler 506 having a passageway base 808 disposed between first and second passageway walls 810(A) and 810(B) defining a fiber passageway. The first and second passageway walls 810(A) and 810(B) are shown comprising the framework 710. The coupler 506 is shown releasably coupled with the end 706 of the concave passageway side 602 of the coupling member 502 and the terminating end 704 of the second trough member 504 terminating at the first trough member 104. Specifically, the latch mechanism 708 disposed in the framework 710 and the first and second passageway walls 810(A) and 810(B) releasably couple the terminating end 704 of the second trough member 504 with the end 706 of the concave passageway side 602 of the coupling member 502.

The trough-coupling system and the components thereof can be made of any material having the desired combination of strength, cost, weight, electrical conductivity, and other material properties, and can be made by conventional manufacturing and assembling processes. Several suitable materials include, for example, metals, plastics, polymers, composites, and the like.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunications trough coupler comprising:
a coupling member to adjustably couple and bridge a portion of a gap between a first trough and a second trough arranged alongside the first trough, the coupling member having:
a passageway base disposed between first and second passageway walls defining the fiber passageway, the passageway base having a convex passageway side to adjustably couple with the first trough and a planar passageway side extending distal to the convex passageway side and bridging a portion of the gap separating the first trough from the second trough;
another coupling member to adjustably couple with the second trough and bridge another portion of the gap separating the first trough from the second trough;
an extension member having a passageway base disposed between first and second passageway walls defining the fiber passageway, the extension member to adjustably couple the coupling member with the other coupling member, the extension member bridging a remaining portion of the gap separating the first trough from the second trough; and
wherein the first and second troughs are substantially within a plane and the extension member, the coupling member, and the other coupling member are substantially within another plane parallel to the plane of the first and second troughs.

2. The telecommunications trough coupler of claim 1, wherein the extension member adjustably couples the coupling member and the other coupling member via a latch mechanism arranged in the first and second passageway walls of the extension member and the first and second passageway walls of the coupling members.

3. The telecommunications trough coupler of claim 1, wherein the extension member bridging the remaining portion of the gap separating the first trough from the second trough comprises a length of up to about 24 inches (60.96 centimeters).

4. The telecommunications trough coupler of claim 1, further comprising:
a support member to adjustably couple with a ridge of the first trough and couple to an underside of the coupling member; and
another support member to adjustably couple with a ridge of the second trough and coupled to an underside of the other coupling member.

5. The telecommunications trough coupler of claim 1, wherein the coupling member and the other coupling member have about a similar height and the first trough and the second trough have about a similar height, the height of the coupling member and the other coupling member being less than the height of the first trough and the second trough.

6. The telecommunications trough coupler of claim 1, wherein the extension member, the coupling member, and the other coupling member are substantially perpendicular to the first trough and the second trough.

7. The telecommunications trough coupler of claim 1, wherein the convex passageway side of the passage way base further comprises:
a first transition tab having a convex surface protruding distal from a first end of the convex passageway side; and
a second transition tab having a convex surface protruding distal from a second end of the convex passageway side opposite the first end, and
wherein the convex surface of the first transition tab and the convex surface of the second transition tab are arranged to face in towards the convex passageway side.

8. The telecommunications trough coupler of claim 7, wherein the convex surfaces of the first transition tab and the second transition tab each comprise a convex surface profile having a bend radius of at least about 1 inch (2.54 centimeters).

9. The telecommunications trough coupler of claim 1, wherein the convex passageway side comprise a convex surface profile having a bend radius of at least about 1 inch (2.54 centimeters).

10. A telecommunications trough coupler comprising:
a coupling member to adjustably couple with a first trough and to couple with a second trough terminating at the first trough, the coupling member having:
a passageway base disposed between first and second passageway walls defining the fiber passageway, the passageway base having a convex passageway side to adjustably couple with the first trough and a concave passageway side extending away from the convex passageway side to couple with the second trough; and
wherein the first and second trough members have substantially planar bottom surfaces substantially within a same plane.

11. The telecommunications trough coupler of claim 10, wherein the concave passageway side of the passageway base comprises a width less than a width of the convex passage way side of the passageway base.

12. The telecommunications trough coupler of claim 11, wherein the width of the concave passageway side of the passage way base is approximately equal to a width of the second trough terminating at the first trough.

13. The telecommunications trough coupler of claim 10, further comprising:
a coupler having a passageway base disposed between first and second passageway walls defining the fiber passageway, the coupler to releasably couple the end of the concave passageway side of the coupling member to the end of the second trough terminating at the first trough.

14. The telecommunications trough coupler of claim 13, wherein the coupler is to releasably couple the end of the concave passageway side of the coupling member with the end of the second trough terminating at the first trough via a latch mechanism disposed in the first and second passageway walls of the coupler.

15. The telecommunications trough coupler of claim 10, wherein the convex passageway side of the passageway base further comprises:
a first transition tab having a convex surface protruding distal from a first end of the convex passageway side;
a second transition tab having a convex surface protruding distal from a second end of the convex passageway side opposite the first end, and
wherein the convex surface of the first transition tab and the convex surface of the second transition tab are arranged to face in towards the convex passageway side.

16. The telecommunications trough coupler of claim 15, wherein the convex surface of the first transition tab and the second transition tab each comprise a convex surface profile having a bend radius of at least about 1 inch (2.54 centimeters).

17. The telecommunications trough coupler of claim 10, further comprising:
a support member adjustably coupled with a ridge of the first trough and coupled to an underside of the coupling member adjustably coupled with the first trough.

18. The telecommunications trough coupler of claim 10, wherein the convex passageway side comprise a convex surface profile having a bend radius of at least about 1 inch (2.54 centimeters).

19. The telecommunications trough coupler of claim 10, wherein the first trough and the second trough are substantially perpendicular.

20. A telecommunications trough coupler comprising:
a coupling member for adjustably coupling and bridging a portion of a gap separating a trough arranged alongside another trough, the coupling member having a passageway base disposed between first and second passageway walls defining a fiber passageway, the passageway base comprising;
a convex passageway side for adjustably coupling with the trough; and
another passageway side opposite the convex passageway side for bridging the portion of the gap separating the trough from the other trough;
another coupling member for adjustably coupling with the other trough and for bridging another portion of the gap separating the trough from the other trough;
an extension member having a passageway base disposed between first and second passageway walls defining the fiber passageway, the extension member to adjustably couple the coupling member with the other coupling member, the extension member bridging a remaining portion of the gap separating the trough from the other trough; and
wherein the trough and the other trough are substantially within a plane and the extension member, the coupling member, and the other coupling member are substantially within another plane parallel to the plane of the trough and the other trough.

21. The telecommunications trough coupler of claim 20, wherein the other passageway side opposite the convex passageway side comprises a planar passageway side extending distal to the convex passageway side for bridging the portion of the gap separating the troughs arranged alongside each other.

* * * * *